United States Patent Office 3,801,526
Patented Apr. 2, 1974

3,801,526
PLASTICIZED VINYL CHLORIDE POLYMER BLENDS HAVING IMPROVED FIRE RETARDANCY
Thor J. G. Lonning, Suffield, Conn., assignor to Monsanto Company, St. Louis, Mo.
No Drawing. Continuation of abandoned application Ser. No. 713,310, Mar. 15, 1968. This application Nov. 30, 1970, Ser. No. 93,858
Int. Cl. C08f 45/30, 45/50; C09k 3/28
U.S. Cl. 260—30.6 R
11 Claims

ABSTRACT OF THE DISCLOSURE

Plasticizer compositions and improved fire retardant, plasticized low-temperature flexible, high tensile propertied vinyl chloride polymer blends containing such compositions, as well as sheets and films made therefrom. These plasticizer compositions employ a combination of two different halogenated hydrocarbons and two different trisubstituted organo phosphates.

This application is a continuation of copending application Ser. No. 713,310, filed Mar. 15, 1968, now abandoned.

BACKGROUND

Fire retardancy in organic polymers has been a subject to which much research and development has been devoted, but the degree of non-flammability heretofore achieved in certain organic polymeric films and sheets (for example, those derived from vinyl chloride type polymers, particularly vinyl chloride polymer derived sheets and films produced by heat fusing blends of material on calender rolls, mill rolls, or the like) has generally not been sufficient to meet performance charactersistics and specifications required for certain use applications, such as in the construction industry, the home finishing field and the like.

Plasticized, low-temperature flexible, high tensile propertied vinyl chloride polymer blends which, when heat fused by calendering into sheet or film form, are to have fire retardancy, have heretofore been difficult to prepare.

Because of their known fire retardant properties, the art desires to use either halogenated hydrocarbons or organo phosphates or both, as flame retardant additives for vinyl chloride polymer blends. However, great difficulties are experienced for a variety of reasons in attempting to use these additives in vinyl chloride polymer blends, intended to be heat fused into sheets and/or films having both low temperature flexibility and high tensile properties.

For one reason, the heat of the calendering rolls used to form particulate blends in sheets and films is commonly sufficient to partially or even fully volatilize or degrade many phosphate-containing and halide-containing fire retardant materials known to the art so that a plasticized film or sheet of vinyl chloride polymer produced from such conventional fire retardants frequently has little or no effective combustion retardance associated with it, compared, for example, to similar film or sheet prepared non-fire retardant containing blends.

For a second reason, films and sheets of plasticized low-temperature flexible, high tensile propertied vinyl chloride polymer, when exposed to a zone of high heat such as occurs at the onset of conditions tending to produce combustion, typically rapidly heat, and do not behave in a manner comparable to that associated with three dimensional solid articles of manufacture wherein larger masses of vinyl chloride polymer are heat fused together to form relatively great thicknesses of plastic. As a consequence, when sheets or films of vinyl chloride polymer are exposed to high-heat conditions tending to produce combustion therein, it is found not only that the sheet and film materials tend to combust far more readily than do such three dimensional solid articles of manufacture under equivalent conditions, but also that once combustion has been initiated in such film or sheet materials, combustion tends to continue and to be self-propagating for reasons not altogether clear, but believed to be associated with the rapidity with which combustion temperatures are generated and maintained in sheets or films of vinyl chloride polymer.

For a third reason, most fire retardants impart to heat fused vinyl chloride polymers either solid phase combustion retardance or vapor phase combustion retardance, but not both. It has now been discovered that both solid phase and vapor phase in imparting fire retardancy to plasticized low-temperature flexible, high tensile propertied vinyl chloride polymers in the form of heat-fused sheets and films.

For a fourth reason, it is very difficult to produce plasticized vinyl chloride polymer derived film and sheet materials which have both a high degree of flexibility as well as good flame retardant properties. In sheets and films, it is generally true that relatively high quantities of flexibilizing agents (such as plasticizers) increase flammability, while relatively high quantities of organic phosphate or halide flame retardant additives either decrease low temperature flexibility or tensile properties (or both) for constant amounts of inorganic fillers (including inorganic flame retardants like antimony oxide). This contradiction in properties must somehow be resolved when one desires to produce a plasticized, flame retarded vinyl chloride polymer derived film or sheet having good low temperature flexibility and good tensile properties. The art has generally heretofore not been successful in overcoming these difficulties when attempting to make plasticized, low-temperature flexible, high tensile propertied vinyl chloride polymer derived sheets and films.

However, it has now been discovered that fire-retardant, plasticized low-temperature flexible, high tensile propertied vinyl chloride polymer derived sheets and films are surprisingly and unexpectedly produced when one adds to a vinyl chloride polymer blend before calendering such into sheets and/or films a special combination of components which both plasticizes and also imparts fire retardancy thereto. This combination of components when admixed with vinyl chloride polymer results in a blend which seemingly synergistically imparts combustion resistance or retardancy to sheets and films produced therefrom without adversely affecting the low-temperature flexibility or high tensile properties generally associated with vinyl chloride polymer derived sheets and films.

Heat-fusible blends of vinyl chloride polymers containing this combination of components can fortunately be made into sheets and films by conventional calendering techniques because of the individual components and their respective processing characteristics with vinyl chloride polymers. This circumstance happily makes it possible for those engaged in the production of vinyl chloride sheets and films to use conventional equipment and existing know-how for the manufacture of fire retardant plasticized sheet and film products of this type. So far as is known, no one has heretofore used or appreciated that this combination of components could be employed to produce fire retardant plasticized vinyl chloride polymer sheet and film products having superior properties.

SUMMARY

This invention is directed to: (a) plasticizer compositions suitable for use in the manufacture of plasticized, fire retardant vinyl chloride polymer derived sheets and films having low temperature flexibility and good tensile properties, (b) blends of vinyl chloride polymer and such plasticizer compositions, (c) sheets and films made from such blends and (d) methods for making the same. These plasticizer compositions are especially adapted to impart both solid phase and adjacent vapor phase combustion retardance to heat fused layers derived from blends thereof with vinyl chloride polymers.

These plasticizer compositions comprise on a total composition of 100 parts by weight:

(A) From about 18 to 27 parts by weight of a first halogenated hydrocarbon having:

(1) a halogen content ranging from about 40 through 68 weight percent,
(2) an average molecular weight of from about 350 through 550 per molecule,
(3) a percent weight loss per time unit at 250° C. of from about 1.5 to 14 percent per minute and a percent weight loss at 350° C. of from about 0 to 29 percent per minute, and
(4) a weight loss rate at 250° C. of from about 40 to 260 mg./min., and a weight loss rate at 350° C. of from about 624 to 0 mg./min.;

(B) From about 18 to 25 parts by weight of a second halogenated hydrocarbon having:

(1) a halogen content ranging from about 58 through 75 weight percent,
(2) an average molecular weight of from about 600 through 1100 per molecule,
(3) a percent weight loss at 250° C. of from about 0.2 to 1 percent per minute, and a percent weight loss at 350° C. of from about 40 to 60 percent per minute, and a percent weight loss at 500° C. of from about 0.5 to 5 percent per minute, and
(4) a weight loss rate at 250° C. of from about 5 to 20 mg./min., a weight loss rate at 350° C. of from about 1000 to 1200 mg./min., and a weight rate at 500° C. of from about 60 to 70 mg./min.;

(C) The difference in said respective weight loss rates between said first halogenated hydrocarbon and said second halogenated hydrocarbon being at least about 489 mg./min. at 350° C. in any given plasticizer composition of the invention;

(D) From about 36 through 42 parts by weight of a first trisubstituted organic phosphate having:

(1) the structure:

(I) 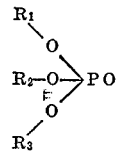

wherein $R_1$, $R_2$ and $R_3$ are each selected from the group of hydrocarbon radicals consisting of aliphatic groups and aromatic groups,
(2) an average of from about 8 through 30 carbon atoms per molecule,
(3) a percent weight loss at 250° C. of from about 2 to 28 percent per minute, and a percent weight loss at 350° C. of from about 0 to 3 percent per minute, and
(4) a weight loss rate at 250° C. of from about 50 to 600 mg./min., and a weight loss rate at 350° C. of from about 0 to 60 mg./min.; and (E) from about 28 through 10 parts by weight of a second trisubstituted organo phosphate having:

(1) the structure:

(II) 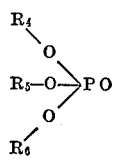

wherein $R_4$, $R_5$ and $R_6$ are each selected from the group consisting of aliphatic hydrocarbon groups containing from 6 through 12 carbon atoms each, aromatic hydrocarbon groups containing from 6 through 12 carbon

TABLE I

| Material type[3] | Wt. percent halogen content (approx.) | Approx. average molecular weight | Percent weight loss[1] (percent) per minute at— | | | Weight loss rate[2] (mg. per minute) at— | | |
|---|---|---|---|---|---|---|---|---|
| | | | 250° C. | 350° C. | 500° C. | 250° C. | 350° C. | 500° C. |
| 1 HA | 42 (Cl) | 530 | 2.13 | 3.2 | ~0 | 47.07 | 70.75 | ~0 |
| 1 HB | 52 (Cl) | 400 | 12.00 | .32 | ~0 | 259.20 | 6.91 | ~0 |
| 1 HC | 40 (Cl) | 520 | | | | | | |
| 1 HD | 40 (Cl) | 320–480 | | | | | | |
| 1 HE | 58 (Cl) | 380–500 | | | | | | |
| 1 HF | 42 (Cl) | 320–480 | | | | | | |
| 1 HG | 54 (Cl) | 325 | 4.17 | 29.14 | ~0 | 89.24 | 623.50 | ~0 |
| 1 HH | 68 (Cl) | 465 | 5.08 | 0 | ~0 | 112.01 | 0 | |
| 1 HI | 60 (Cl) | 550 | 1.50 | 26.00 | ~0 | 34.28 | 594.10 | ~0 |
| 2 HA | 70 (Cl) | 1,000 | .77 | 52.00 | 3.00 | 16.48 | 1,112.80 | 64.2 |
| 2 HB | 60 (Cl) | 600–800 | | | | | | |
| 2 HC | 70 (Cl) | 900–1,100 | | | | | | |

[1] Determined by procedure defined above using TGA apparatus.
[2] Determined by procedure defined above using TGA apparatus.
[3] Material types are listed below. Except for the Aroclors (see below), all are petroleum derived chlorinated paraffinic hydrocarbons which are chlorinated following separation from crude oil. The Aroclors are chlorinate biphenyls. The designation 1H is used to indicate first halogenated hydrocarbons, while the designation 2H is used to indicate second halogenated hydrocarbons:

Material 1HA is a chlorinated paraffinic hydrocarbon available commercially as Cereclor S-42 (a trademark of Imperial Chemical Industries, Inc.).
Material 1HB is a chlorinated paraffinic hydrocarbon commercially available as Cereclor S-52 (a trademark of Imperial Chemical Industries, Inc.).
Material 1HC is a chlorinated paraffinic hydrocarbon commercially available as Flexchlor 40 (a trademark of Pearsall Co.).
Material 1HD is a chlorinated paraffinic hydrocarbon commercially available as Chlorowax 40 (a trademark of Diamond Alkali Co.).
Material 1HE is a chlorinated paraffinic hydrocarbon commercially available as Chlorowax 500 (a trademark of Diamond Alkali Co.).
Material 1HF is a chlorinated paraffinic hydrocarbon commercially available as Chlorafin 42S (a trademark of Hercules Powder).
Material 1HG is a chlorinated biphenyl commercially available as Aroclor 1254 (a trademark of Monsanto Co.).
Material 1HH is a chlorinated biphenyl commercially available as Aroclor 1268 (a trademark of Monsanto Co.).
Material 1HI is a chlorinated polybiphenyl commercially available as Aroclor 5460 (a trademark of Monsanto Co.).
Material 2HA is a chlorinated paraffinic hydrocarbon commercially available as Cereclor S-70 (a trademark of Imperial Chemical Industries, Inc.).
Material 2HB is a chlorinated paraffinic hydrocarbon commercially available as Flexchlor 60 (a trademark of Pearsall Co.).
Material 2HC is a chlorinated paraffinic hydrocarbon commercially available as Chlorowax 70 (a trademark of Diamond Alkali Co.).

TABLE II

| Material type [3] | Halogen content | Phosphorous content | Mol. weight | Percent weight loss [1] (percent per minute) at— | | | Weight loss rate [2] (mg. per minute) at— | | | Substituent | | | | | |
|---|---|---|---|---|---|---|---|---|---|---|---|---|---|---|---|
| | | | | | | | | | | Formula 1 | | | Formula 2 | | |
| | | | | 250° C. | 350° C. | 500° C. | 250° C. | 350° C. | 500° C. | R₁ | R₂ | R₃ | R₄ | R₅ | R₆ |
| 1 PA | | 9.13 | 340.2 | 3.08 | 0 | ~0 | 70.3 | ~0 | ~0 | Cresyl | Phenyl | Phenyl | | | |
| 1 PB | | 8.58 | 362.4 | 18.86 | 1.65 | ~0 | 379.02 | 53.09 | ~0 | Octyl | do | do | | | |
| 1 PC | | 7.95 | 390.4 | 8.33 | 2.40 | ~0 | 189.92 | 54.72 | ~0 | Isodecyl | do | do | | | |
| 1 PD | | 8.44 | 368.18 | 5.46 | 1.07 | ~0 | 115.75 | 22.68 | ~0 | Cresyl | Cresyl | Cresyl | | | |
| 1 PE | | 7.15 | 434.63 | 25.71 | ~0 | ~0 | 583.62 | 0 | ~0 | Octyl | Octyl | Octyl | | | |
| 1 PF | | 7.56 | 410 | | | | | | | Xylyl | Xylyl | Xylyl | | | |
| 2 PA | 10.88 (Cl) | 7.92 | 391.8 | 10.40 | ~0 | ~0 | 216.32 | ~0 | ~0 | | | | Chloro-phenyl | Phenyl | Phenyl. |
| 2 PB | 12.42 (Cl) | 10.85 | 286 | 41.6 | ~ | ~0 | 898.56 | ~0 | ~0 | | | | Beta-chloroethyl | Phenyl | |
| 2 PC | 67.1 (Cl) | 6.52 | 476.22 | | | | | | | | | | Tri-chloroethyl | | |
| 2 PD | 43.8 (Br) | 8.52 | 364.98 | | | | | | | | | | 2,3-dibromopropyl | | |

[1] Determined by procedure defined above using TGA apparatus.
[2] Determined by procedure defined above using TGA apparatus.
[3] Material types are listed below. The designation 1P is used to indicate first trisubstituted organo phosphates while the designation 2P is used to indicate second trisubstituted organo phosphates:
 1 PA = cresyl diphenyl phosphate.
 1 PB = octyl diphenyl phosphate.
 1 PC = isodecyl diphenyl phosphate.
 1 PD = tricresyl phosphate.
 1 PE = trioctyl phosphate.
 1 PF = trixylyl phosphate.
 2 PA = chlorophenyl diphenyl phosphate (mostly paraisomers).
 2 PB = tris(Beta-chloroethyl) phosphate.
 2 PC = trichloroethyl phosphate.
 2 PD = tris(2,3-dibromopropyl) phosphate.

atoms each, halogenated aliphatic hydrocarbon groups containing from 2 through 18 carbon atoms each and at least one halogen atom for every 2 carbon atoms and halogenated aromatic hydrocarbon groups containing from 3 through 18 carbon atoms each and at least one halogen atom for every 6 carbon atoms,
(2) a halogen content of at least about 10 weight percent,
(3) a percent weight loss at 250° C. of from about 10 to 50 percent weight loss at 250° C. of from about 10 to 50 percent per minute, and a percent weight loss at 350° C. of from about 0 to 2 percent per minute, and
(4) a weight loss rate at 250° C. of from about 200 to 950 mg./min. and a weight loss rate at 350° C. of from about 0 to 2 mg./min.

The term "percent weight loss per time unit" as used has reference to fluorine, chlorine and bromine. Largely for contemporary economic reasons, chlorine is preferred for use in this invention.

Unless otherwise noted, "weight percent" has reference to weight percent of a given component, not a total combination.

The term "percent weight loss per time unit" as used herein has reference to weight loss as determined in a so-called Du Pont Model 950 thermal gravimetric analyzer at an average charge of 20-23 mg. of sample material in air using a heating rate of about 20° C./minute.

The term "weight loss rate" as used herein has reference to weight loss expressed per unit of time as determined in a so-called Du Pont Model 950 thermal gravimetric analyzer at an average charge of 20-23 mg. of sample material in air using a heating rate of about 20° C./minute.

The preceding Table I illustrates some suitable first halogenated hydrocarbons and some suitable second halogenated hydrocarbons for use in the present invention.

Table II, above, illustrates some suitable first trisubstituted organo phosphates and some suitable second trisubstituted organo phosphates for use in the present invention.

The plasticizer compositions of this invention either can be prepared in the form of mixtures (preferably uniform), or they can be mixed separately with vinyl chloride polymer to produce directly novel heat-fusible, uniform blends of plasticizer composition and vinyl chloride polymer. Typical plasticizer uniform mixtures may be in the form of solids or liquids (solutions or dispersions) while typical uniform blends are in the form of particulate, free flowing solids.

When making a uniformly blended plasticizer system of this invention, and when making a uniform mixture of such system with a vinyl chloride polymer, it is convenient and suitable to blend the respective components together in an appropriate conventional blender until uniformity is reached. Suitable mechanical blenders include chain can mixers, ball mills, ribbon blenders, Henschel blenders and the like, depending upon circumstances.

The term "vinyl chloride polymer" as used herein refers to a polymer produced not only by polymerizing vinyl chloride monomer to produce polyvinyl chloride homopolymer, but also by copolymerizing vinyl chloride monomer with other ethylenically unsaturated aliphatic monomers having molecular weights generally under about 260 and copolymerizable with vinyl chloride to produce polyvinyl chloride include olefins, such as ethylene, propylene and the like; vinylidene monomers, such as vinyl esters of monobasic organic acids containing 1–20 carbon atoms (e.g., vinyl ether, 2-ethylhexyl vinyl ether, benzyl vinyl ether, etc.) and vinylidene chloride; acryl acrylate esters in which the alkyl group contains 1–20 carbon atoms (e.g., methyl acrylate, butylacrylate, octadecyl acrylate, etc.); the corresponding alkyl methacrylate esters; dialkyl esters of dibasic organic acids in which the alkyl groups contain 2–8 carbon atoms (e.g., dibutyl fumarate, diethyl maleate, etc.); and the like.

Preferred vinyl chloride polymers have chlorine contents ranging from about 45.0 to 56.7 and have molecular weights such that a 0.4 weight percent solution of such polymer in cyclohexanone at 25° C. has a specific viscosity of from about 0.3 to 0.6. More preferred specific viscosities range from about 0.4 to 0.5. A preferred class of vinyl chloride polymer is polyvinyl chloride homopolymer. In general, one should choose a vinyl chloride ploymer for use in the present invention which will offer most satisfactory properties in a particular desired heat fused sheet or film product.

Conventional additives, such as stabilizers, fillers, colorants, processing aids, lubricants, co-plasticizers, etc., can optionally be incorporated into the blends of this invention, if desired. Thus, for example, among the processing aids and co-plasticizers which may be incorporated into the blends of this invention are finely divided thermoplastic polymers having molecular weights in excess of about 15,000 such as methyl methacrylate polymers, styrene-acrylonitrile copolymers, styrene-methyl methacrylate copolymers, paraffins and the like. The blends of this invention may contain the conventional stabilizers, lubricants and fillers employed in the art for compounding vinyl chloride polymer blends, such as antimony oxide and epoxy components. In general, care must be used when employing such additives that one does not reduce the fire-retardant properties, the low-temperature flexibility properties, and the tensile properties desired in sheets and films made from blends of this invention. Usually, the total quantity of such additives in a given blend does not exceed about 15 weight percent thereof.

It is convenient, though not necessary, when preparing a blend of a plasticizer composition of this invention with vinyl chloride polymer to use such polymeric materials in the form of particles at least 90 weight percent of which pass through a 40 mesh USBS sieve. It will be appreciated herein that the term "blend" unless otherwise indicated has reference to one comprising both a plasticizer composition of this invention and vinyl chloride polymer as described above. Such blend may exist in various physical forms particularly in particulate forms, including pellets cut from a fused mass of the blend, or as an unfused physical mixture. Selection of a particular particle form for a given product blend is optional and is influenced by the particular end use to which a given product blend is to be put.

The polyvinyl chloride and optional polymeric additives can be preblended together before being admixed with a plasticizer composition of the invention, or not, as desired. Preblending can be accomplished by simple, conventional physical mixing using, for example, a ribbon blender, or the like.

The blends of this invention can be made either by intensive mechanical mixing without fusion in powder form, or by mechanical mixing with heat-fusion followed by dicing (or other equivalent procedure of particulation).

When using the latter technique, it is convenient and preferred to prepare a preblend mixture of starting materials by mechanically mixing same, and then to subject such preblend for a short period of time to further mixing at a temperature above the fusion (melting) temperature of the resinous (polymeric) components (starting materials) to homogenize same. This homogenizing procedure may be performed on a 2-roll rubber mill until the polymer fuses and a rolling bank is formed. The roll temperatures are maintained at about 150–170° C. throughout the mixing operation. Alternatively, such a preblend may be homogenized and fused in a Banbury Mixer.

When preparing a non-fused powder blend, vinyl chloride polymer and plasticizer composition (plus optional additives) are conveniently mechanically blended in an intensive mixer, such as a Henschel Mixer, or the like.

In general, the mechanical blends of this invention should be preferably so intimately admixed as respects the mixture of components thereof that the resulting blend when subsequently heat fused statically in an air-oven shall demonstrate a substantial freedom from discoloration from 10 minutes at 190° C. at atmospheric pressure.

In general, a blend of the invention contains both a vinyl chloride polymer and a plasticizer composition. For each 100 parts by weight of such polymer, there are employed from about 18 through 90 parts by weight of a plasticizer composition of this invention. Preferably, a blend contains either position of this invention. Preferably, a blend contains from about 3 through 20 parts by weight of such a plasticizer composition per 100 parts by weight of such polymer.

To form blends into sheets or films are heat-fused by calendering such blends. Heat fusion may be conventionally accomplished preferably using temperatures ranging from about 130 to 215° C. The apparatus used, for example, may be:

(a) a Banbury Mixer
(b) a two-roll mill
(c) an extruder, especially a screw type
(d) a calender roll series or the like, as those skilled in the art will appreciate.

Sheets and films are made from blends of the invention by calendering same at temperatures generally ranging from about 130° C. to 215° C. depending upon quantity of plasticizer employed in a given blend.

By the term "layer" as used hereafter, generic reference is had to both sheet and film. The term "sheet" refers to heat-fused blends having a thickness in excess of 10 mils, while "film" refers to heat-fused blends having a thickness less than 10 mils. In general, layers are derived from blends of the invention as described above. Layers of this invention, as indicated earlier, have fire retardancy, low temperature flexibility and high tensile properties.

Fire retardancy, for purposes of this invention, can be measured using either one of two procedures. One is designated ASTM Test Procedure No. E84–61; the other is designated Federal Specification No. CCC–T–191B (Methods 5902 and/or 5903). Films are typically evaluated using the latter procedure which tests flame retardancy in a vertically suspended sample. The first procedure is a tunnel test which evaluates flame propagation in a non-vertically suspended sample.

As used herein, the term "low temperature flexibility" has reference to the flexibility of a sheet or film derived from a heat-fused vinyl chloride polymer blend of this invention measured under certain controlled conditions by the so-called Masland Cold Crack procedure as described in ASTM Test Procedure No. D-1790-62 and Federal Specification CCC-T-191b, Method 5874.

Similarly, as used herein, the term "high tensile properties" has reference to mechanical properties of a sheet or film derived from a heat-fused vinyl chloride polymer blend of this invention measured under certain controlled conditions. To have "high tensile properties" as the term is used herein, at least two of three measurements on a given film or sheet sample are made, as follows:

(1) percent elongation using ASTM Test Procedure No. D-888-61,
(2) 100% modulus using ASTM Test Procedure No. D-888-61,
(3) Ultimate Tensile Strength using ASTM Test Procedure No. D-888-61.

In making a blend of the invention, it is prefererd to heat-fuse, and then particulate the components, in contrast to merely mechanically intermixing the same, before making a layer of the invention.

Preferred first and preferred second halogenated hydrocarbons are chlorinated paraffinic hydrocarbons.

Preferred first trisubstituted organo phosphates have phosphorous contents ranging from about 7.5 to 9.5 weight percent per molecule, and molecular weights ranging from about 325 to 450.

Preferred second trisubstituted organo phosphates have halogen contents ranging from about 10 to 70 weight percent, phosphorous contents ranging from about 6.5 to 11 weight percent, and molecular weights ranging from about 275 to 475.

When it is desired to make relatively semi-rigid layers, it is preferred to use from about 35 to 70 parts by weight of a plasticizer composition of the invention for each 100 parts by weight of vinyl chloride polymer.

When it is desired to make relatively flexible layers, it is preferred to use from about 75 to 85 parts by weight of a plasticizer composition of the invention for each 100 parts by weight of vinyl chloride polymer.

Preferred blends of the invention and preferred layers of the invention each contain from about 2–15 parts by weight of antimony oxide to augment, if possible, fire retardant properties.

Preferred blends of the invention and preferred layers of the invention each contain from about 1 to 5 parts by weight of an inert (as respects components of a blend) organic nitrogen containing blowing agent adapted to release nitrogen when heated (dry) in air above about 215° C. (and preferably above about 225° C.). Preferred blowing agents are semicarbazides of the type disclosed in U.S. Pat. Nos. 3,152,176 and 3,235,519; a most preferred blowing agent is p-toluene sulfonyl semicarbazide.

In place of vinyl chloride polymers, one can formulate with the plasticizer compositions of this invention as generally taught herein other plasticizable polymers known to those of ordinary skill in the art, especially styrene polymer and urethane polymers.

EMBODIMENTS

The following additional examples are set forth to illustrate more clearly the principles and practices of this invention to one skilled in the art, and they are not intended to be restrictive but merely to be illustrative of the invention herein contained. Unles otherwise stated herein, all parts and percentages are on a weight basis.

Examples 1 and 2

A plasticizer composition of this invention is prepared by uniformly mechanically admixing together at elevated temperature and pressure to form a liquid mixture of the following components in the respective amounts (parts by weight) indicated for each (there being 100 parts by weight in each composition):

|  | Ex. 1 | Ex. 2 |
|---|---|---|
| Parts by wt. of first trisubstituted organophosphate | 39 | 40.5 |
| Parts by wt. of second trisubstituted organo phosphate | 20 | 12.5 |
| Parts by wt. of first halogenated hydrocarbon | 21.5 | 25 |
| Parts by wt. of second halogenated hydrocarbon | 19.5 | 22 |

The first halogenated hydrocarbon is a liquid chlorinated paraffinic hydrocarbon designated as Material 1HB in Table I.

The second halogenated hydrocarbon is a solid chlorinated paraffinic hydrocarbon designated as Material 2HA in Table I.

The first trisubstituted organo phosphate is isodecyl diphenyl phosphate (designated as Material 1PC in Table II).

The second trisubstituted organo phosphate is chlorophenyl diphenyl phosphate (designated as Material 2PA in Table II).

The plasticizer of Example 2 is particularly useful in the manufacture of vinyl chloride polymer blends intended for use in the manufacture of semi-rigid layers while the plasticizer composition of Example 1 is particularly useful in the manufacture of vinyl chloride polymer blends intended for use in the manufacture of highly plasticized layers.

Alternately, if desired, the above components can be separately added to a vinyl chloride polymer to form in situ a plasticizer composition of this invention.

The plasticizer of Example 1 is particularly useful in the manufacture of vinyl chloride polymer blends intended for use in the manufacture of semi-rigid layers while the plasticizer composition of Example 2 is particularly useful in the manufacture of vinyl chloride polymer blends intended for use in the manufacture of highly plasticized layers.

Alternately, if desirtd, the above components can be separately added to a vinyl chloride polymer to form in situ a plasticizer composition of this invention.

Examples 3–27

Polymer blends of the invention are prepared by directly incorporating a plasticizer composition of the invention with a vinyl chloride polymer. To make each blend, polymer, plasticizer composition, and additives are dryblended together. Layers of the invention are prepared therefrom by first adding each blend to a so-called Banbury type mixer wherein the components are heat-fused to a uniform mass. Thereafter, a fused mass is continuously fed first to a mill roll and then to a set of four calender rolls to produce a desired layer. Processing temperatures range from about 130 to 215° C. Details and results are shown in Table III below.

The layers of Examples 3–20 are each about 6 mils in average thickness while those of Examples 21–27 are each about 3.5 to 4 mils in average thickness.

The plasticizer compositions, blends and layers of this invention are thus seen to have excellent fire-retardancy, low temperature flexibility and tensile strength properties.

TABLE III

| Example | 3 | 4 | 5 | 6 | 7 | 8 | 9 | 10 | 11 | 12 | 13 | 14 | 15 |
|---|---|---|---|---|---|---|---|---|---|---|---|---|---|
| Polymer: | | | | | | | | | | | | | |
| PVC [1] | 100 | 60 | | | 100 | 100 | 100 | 100 | 100 | 100 | 100 | 100 | 100 |
| VC/CPE [2] | | 40 | 100 | | | | | | | | | | |
| VC/VA [3] | | | | 100 | | | | | | | | | |
| Plasticizer [4]: | | | | | | | | | | | | | |
| 1 HA | | | | | 16 | | | | | | | | |
| 1 HB | 20 | 20 | 20 | 20 | | | 20 | 20 | 20 | 22 | 20 | 20 | 20 |
| 1 HE | | | | | | 20 | | | | | | | |
| 1 HI | | | | | 20 | | | | | | | | |
| 2 HA | 18 | 18 | 18 | 18 | 18 | 18 | 18 | 18 | 18 | 18 | 18 | 18 | 18 |
| 2 HB | | | | | | | | | | | | | |
| 1 PB | | | | | | 34 | 34 | | | | | | |
| 1 PC | 34 | 32 | 31 | 33 | 34 | | | 34 | | 32 | 34 | 34 | 34 |
| 1 PD | | | | | | | | | 32 | | | | |
| 1 PE | 10 | 10 | 8 | 10 | 11 | 10 | 10 | | | | | | |
| 2 PA | | | | | | | | | 10 | 10 | 10 | 10 | 10 |
| 2 PB | | | | | | | | | | | | | |
| 2 PC | | | | | | | | | | | | | |
| 2 PD | | | | | | | | | | | | | 10 |
| Other plasticizers: Epoxy types [5] | 3 | 3 | 3 | 3 | 3 | 3 | 3 | 3 | 3 | 3 | 3 | 3 | 3 |
| Stabilizers: | | | | | | | | | | | | | |
| Mark 1004 [6] | 2.5 | 2.5 | 2.5 | 2.5 | 2.5 | 2.5 | 2.5 | 2.5 | 2.5 | 2.5 | 2.5 | 2.5 | 2.5 |
| Mark C [7] | 0.25 | 0.25 | 0.25 | 0.25 | 0.25 | 0.25 | 0.25 | 0.25 | 0.25 | 0.25 | 0.25 | 0.25 | 0.25 |
| Irganox 1076 [8] | | | | | | | | | | | | | |
| Lubricant: | | | | | | | | | | | | | |
| Stearic acid | 0.5 | 0.5 | 0.5 | 0.5 | 0.5 | 0.5 | 0.5 | 0.5 | 0.5 | 0.5 | 0.5 | 0.5 | 0.5 |
| Fatty acid ester [9] | | | | | | | | | | | | | |
| Pigments: | | | | | | | | | | | | | |
| Antimony oxide [10] | 5 | 5 | 5 | 5 | 5 | 5 | 5 | 5 | 5 | 5 | 5 | 5 | 5 |
| Titanium oxide [11] | 3 | 3 | 3 | 3 | 3 | 3 | 3 | 3 | 3 | 3 | 3 | 3 | 3 |
| Aluminum paste [12] | | | | | | | | | | | | | |
| Modifier: | | | | | | | | | | | | | |
| Acryloid K-120-N [13] | | | | | | | | | | | | | |
| Acryloid KM-607 [14] | | | | | | | | | | | | | |
| Blowing agent: Celogen RA [15] | | | | | | | | | | | | | |
| Physical properties: | | | | | | | | | | | | | |
| Flame retardancy [16] | −1−1 | 2−6 | 6−10 | 4−10 | 2−6 | 0−2 | 0−4 | 2−6 | 2−9 | 2−6 | 2−6 | 2−6 | 1−5 |
| Masland, °C [17] | −42 | −43−46 | −45−52 | −41−45 | −41−45 | −40−44 | −40−44 | −41−44 | −45−52 | −40−45 | −40−44 | −40−44 | −40−44 |
| Roller, °C [18] | 320−400 | 320−400 | 320−400 | 320−400 | 320−400 | 320−400 | 320−400 | 320−400 | 320−400 | 320−400 | 320−400 | 320−400 | 320−400 |
| Elongation [19] | 900−1,200 | 900−1,200 | 900−1,200 | 900−1,200 | 900−1,200 | 900−1,200 | 900−1,200 | 900−1,200 | 900−1,200 | 900−1,200 | 900−1,200 | 900−1,200 | 900−1,200 |
| 100% modulus [20] | 2,100−2,500 | 2,100−2,500 | 2,100−2,500 | 2,100−2,500 | 2,100−2,500 | 2,100−2,500 | 2,100−2,500 | 2,100−2,500 | 2,100−2,500 | 2,100−2,500 | 2,100−2,500 | 2,100−2,500 | 2,100−2,500 |
| Ultimate tensile strength [21] | | | | | | | | | | | | | |

| Example | 16 | 17 | 18 | 19 | 20 | 21 | 22 | 23 | 24 | 25 | 26 | 27 |
|---|---|---|---|---|---|---|---|---|---|---|---|---|
| Polymer: | | | | | | | | | | | | |
| PVC [1] | 100 | 100 | 95 | 95 | 100 | 100 | 100 | 100 | 100 | 100 | | 100 |
| VC/CPE [2] | | | | | | | | | | | 100 | |
| VC/VA [3] | | | | | | | | | | | | |
| Plasticity [4]: | | | | | | | | | | | | |
| 1 HA | | | | | | | | | | | | |
| 1 HB | 20 | 20 | 20 | 20 | 18 | 10 | 10 | 11.5 | 12.5 | 14 | 12 | 20 |
| 1 HE | | | | | | | | | | | | |
| 1 HI | | | | | | | | | | | | |
| 2 HA | 18 | 18 | 18 | 18 | | 9 | 9 | 10.2 | 11.4 | 12.6 | 12.6 | 18 |
| 2 HB | | | | | 20 | | | | | | | |
| 1 PB | | | | | | | | | | | | |
| 1 PC | 34 | 34 | 34 | 34 | 34 | 18 | 17 | 20.5 | 23 | 26 | 25 | 34 |
| 1 PD | | | | | | | | | | | | |
| 1 PE | | | | | | | | | | | | |
| 2 PA | 10 | 10 | 10 | 10 | 10 | 10.5 | 9.5 | 12 | 13.5 | 15 | 15 | 10 |
| 2 PB | | | | | | | | | | | | |
| 2 PC | | | | | | | | | | | | |
| 2 PD | | | | | | | | | | | | |
| Other plasticizers: Epoxy types [5] | 3 | 3 | 3 | 3 | 3 | 3 | 3 | 3 | 3 | 3 | 3 | 3 |
| Stabilizers: | | | | | | | | | | | | |
| Mark 1004 [6] | 2.5 | 2.5 | 2.5 | 2.5 | 2.5 | 2.75 | 2.75 | 2.75 | 2.75 | 2.75 | 2.75 | 2.5 |
| Mark C [7] | 0.25 | 0.25 | 0.25 | 0.25 | 0.25 | 0.25 | 0.25 | 0.25 | 0.25 | 0.25 | 0.25 | 0.5 |
| Irganox 1076 [8] | | | | | | | | | | | | |

See footnotes at end of table.

TABLE III—Continued

| Example | 16 | 17 | 18 | 19 | 20 | 21 | 22 | 23 | 24 | 25 | 26 | 27 |
|---|---|---|---|---|---|---|---|---|---|---|---|---|
| Lubricant: | | | | | | | | | | | | |
| Stearic acid | | 0.5 | 0.5 | 0.5 | 0.5 | 0.5 | 0.5 | 0.5 | 0.5 | 0.5 | 0.5 | 0.5 |
| Fatty acid ester [9] | 0.7 | | | | | | | | | | | |
| Pigments: | | | | | | | | | | | | |
| Antimony oxide [10] | 5 | 5 | 5 | 5 | 5 | 5 | 5 | 5 | 5 | 5 | 5 | |
| Titanium oxide [11] | 3 | 3 | 3 | 3 | 3 | | | | | | | |
| Aluminum paste [12] | | | | | | 2.5 | 2.5 | 2.5 | 2.5 | 2.5 | 2.5 | |
| Modifier: | | | | | | | | | | | | |
| Acryloid K-120-N [13] | | | 5 | | 5 | | | | | | | |
| Acryloid KM-607 [14] | | 2 | | 5 | | | | | | | | |
| Blowing agent: Celogen RA [15] | | | | | | | | | | | | |
| Physical properties: | | | | | | | | | | | | |
| Flame retardancy [16] | −1–1 | −1–½ | 2–4 | 2–4 | 1–4 | −2–1 | 6–10 | 0–2 | 0–3 | 0–4 | 6–12 | 8–25 |
| Masland, ° C.[17] | −42 | −42 | −40–44 | −42–46 | −36–40 | −8–+1 | −10–−6 | −6–−1 | −8–−5 | −15–−7 | −20–−14 | −42 |
| Roller, ° C.[18] | 320–400 | 320–400 | 320–400 | 320–400 | 320–400 | 220–250 | 220–250 | 230–260 | 240–270 | 240–280 | 250–290 | 320–400 |
| Elongation [19] | 900–1,200 | 900–1,200 | 900–1,200 | 900–1,200 | 900–1,200 | 3,000–3,300 | 2,900–3,300 | 2,500–3,000 | 2,000–2,500 | 1,700–1,900 | 1,700–1,900 | 900–1,200 |
| 100% modulus [20] | 2,100–2,500 | 2,100–2,500 | 2,100–2,500 | 2,100–2,500 | 2,100–2,500 | 4,100–4,700 | 4,100–4,700 | 3,600–3,900 | 3,100–3,500 | 2,800–3,200 | 2,800–3,200 | 2,100–2,500 |
| Ultimate tensile strength [21] | | | | | | | | | | | | |

[1] This polyvinyl chloride homopolymer has a specific viscosity in cyclohexanone at 20° C. of about .48 and is available commercially as Opalon 650 (a trademark of the Monsanto Co.).
[2] This graft copolymer of vinyl chloride on chlorinated polyethylene is as described in Example 1 of Beer U.S. Patent 3,268,623.
[3] This copolymer of vinyl chloride and vinyl acetate is made using a 3% vinyl acetate and has an inherent viscosity in cyclohexanone at 25° C. of about 1.07 (available commercially as VYNW, a trademark of Union Carbide Plastics Co.).
[4] These plasticizers are as described in Tables II and I above.
[5] This epoxy plasticizer functions as a stabilizer and fungicide and is a composition comprising epoxidized soy bean oil and phenoxarsine compound (available commercially as Vinyzene BP-5, a trademark of the Scientific Chemical Co.).
[6] Mark 1004 (a trademark of the Argus Chemical Co.) is a solid barium/cadmium fatty acid stabilizer.
[7] Mark C (a trademark of the Argus Chemical Co.) is an organic trisubstituted phosphite chelator.
[8] Irganox 1076 (a trademark of Geigy Chemical Corp.) is a high molecular weight hindered phenol antioxidant.
[9] This fatty acid ester lubricant is available commercially under the trade designation 55-D-44 from the Rohm and Haas Co.
[10] This antimony oxide is in the form of particles substantially 100% of which are smaller than 10 microns.
[11] This titanium oxide pigment is in the form of particles substantially 100% of which are less than 10 microns in average particle sizes, all in dioctyl phthalate (60 wt. percent).
[12] This aluminum paste contains a dispersion of aluminum particles (40 wt. percent) substantially 100% of which are less than 10 microns.
[13] This is an acrylic polymeric modifier available commercially under the trade designation Acryloid K-120-N (a trademark of the Rhom and Haas Co.).
[14] This is a methacrylate/styrene polymeric material available commercially under the trade designation Acryloid KM 607 (a trademark of the Rohm and Haas Co.).
[15] Celogen RA (a trademark of Naugatuck Chemicals, a division of United States Rubber Co.) is a high temperature blowing agent, p-toluene sulfonyl semi-carbazide.
[16] Flame retardancy is here determined using the so-called Federal Test designated CCC-T-191b, Method 5902 with the exception that flame source is withdrawn after 6 seconds rather than the specified 12 seconds to make the test more severe.
[17] Low temperature brittleness is here determined using ASTM Procedure No. D1790-62.
[18] Low temperature brittleness is here determined using Federal Specification, CCC-T-191b, Method 5874.
[19] Elongation is here determined using ASTM test Procedure No. D-888-61.
[20] 100% modulus is here determined using ASTM test Procedure No. D-888-61.
[21] Ultimate tensile strength is here determined using ASTM test Procedure No. D-888-61.

The embodiments of this invention in which an exclusive property or privilege is claimed are defined as follows:

1. A plasticizer composition suitable for use in the manufacture of plasticized, fire retardant vinyl chloride polymer derived sheets and films comprising:

(A) from about 18 to 27 parts by weight of a first halogenated hydrocarbon having:
  (1) a halogen content ranging from about 40 through 68 weight percent,
  (2) an average molecular weight of from about 350 through 550 per molecule,
  (3) a percent weight loss per time unit at 250° C. of from about 1.5 to 14 percent per minute and a percent weight loss at 350° C. of from about 0 to 29 percent per minute, and
  (4) a weight loss rate at 250° C. of from about 40 to 260 mg./min., and a weight loss rate at 350° C. of from about 624 to 0 mg./min.;

(B) from about 18 to 25 parts by weight of a second halogenated hydrocarbon having:
  (1) a halogen content ranging from about 58 through 75 weight percent,
  (2) an average molecular weight of from about 600 through 1100 per molecule,
  (3) a percent weight loss at 250° C. of from about 0.2 to 1 percent per minute, and a percent weight loss at 350° C. of from about 40 to 60 percent per minute, and a percent weight loss at 500° C. of from about 0.5 to 5 percent per minute, and
  (4) a weight loss rate at 250° C. of from about 5 to 20 mg./min., a weight loss rate at 350° C. of from about 1000 to 1200 mg./min., and a weight loss rate at 500° C. of from about 60 to 70 mg./min.;

(C) the difference in said respective weight loss rates between said first halogenated hydrocarbon and said second halogenated hydrocarbon being at least about 489 mg./min. at 350° C. in any given plasticizer composition of the invention;

(D) from about 36 through 42 parts by weight of a first trisubstituted organo phosphate having:
(1) the structure:

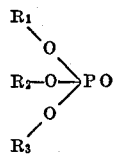

wherein $R_1$, $R_2$ and $R_3$ are each selected from the group of hydrocarbon radicals consisting of aliphatic groups and aromatic groups,
(2) an average of from about 8 through 30 carbon atoms per molecule,
(3) a percent weight loss at 250° C. of from about 2 to 28 percent per minute, and a percent weight loss at 350° C. of from about 0 to 3 percent per minute, and
(4) a weight loss rate at 250° C. of from about 50 to 600 mg./min., and a weight loss rate at 350° C. of from about 0 to 60 mg./min.; and (E) from about 28 through 10 parts by weight of a second trisubstituted organo phosphate having:
(1) the structure:

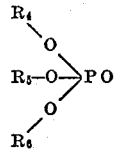

wherein $R_4$, $R_5$ and $R_6$ are each selected from the group consisting of aliphatic hydrocarbon groups containing from 6 through 12 carbon atoms each, aromatic hydrocarbon groups containing from 6 through 12 carbon atoms each, halogenated aliphatic hydrocarbon groups containing from 2 through 18 carbon atoms each and at least one halogen atom for every 2 carbon atoms and halogenated aromatic hydrocarbon groups containing from 3 through 18 carbon atoms each and at least one halogen atom for every 6 carbon atoms,
(2) a halogen content of at least about 10 weight percent,
(3) a percent weight loss at 250° C. of from about 10 to 50 percent per minute, and a percent weight loss at 350° C. of from about 0 to 2 percent per minute, and
(4) a weight loss rate at 250° C. of from about 200 to 950 mg./min. and a weight loss rate at 350° C. of from about 0 to 2 mg./min.

2. The plasticizer composition of claim 1 wherein said first halogenated hydrocarbon is a chlorinated paraffinic hydrocarbon.

3. The plasticizer composition of claim 1 wherein said second halogenated hydrocarbon is a chlorinated paraffinic hydrocarbon.

4. The plasticizer composition of claim 1 wherein said first trisubstituted organo phosphate has a phosphorous content ranging from about 7.5 to 9.5 and a molecular weight of from about 325 to 450.

5. The plasticizer composition of claim 1 wherein said second trisubstituted organo phosphate has a halogen content of from about 10 to 70 weight percent, a phosphorous content of from about 6.5 to 11 weight percent, and a molecular weight of from about 275 to 475.

6. A plasticized, fire retardant, low-temperature flexible, high tensile propertied, heat fusible blend comprising in combination:
(A) a vinyl chloride polymer and
(B) a plasticizer composition of claim 1, there being for each 100 parts by weight of said polymer from about 18 to 90 parts by weight of said plasticizer composition.

7. The blend of claim 6 containing additionally from about 2 to 15 parts by weight of antimony oxide for each 100 parts by weight of said polymer.

8. The blend of claim 6 containing additionally from about 1 to 5 parts by weight of an inert, organic nitrogen containing blowing agent adapted to release nitrogen gas when heated in air above about 215° C.

9. A plasticized flame retardant, low-temperature, flexible high tensile propertied layer comprising the blend of claim 6.

10. A plasticized flame retardant, low-temperature, flexible high tensile propertied layer comprising the blend of claim 8.

11. A plasticized flame retardant, low-temperature, flexible high tensile propertied layer comprising the blend of claim 7.

References Cited
UNITED STATES PATENTS

| | | | |
|---|---|---|---|
| 2,418,843 | 4/1947 | Leatherman | 106—15 FP |
| 2,634,243 | 4/1953 | Glenn | 260—2.5 |
| 2,669,521 | 2/1954 | Bierly | 106—15 FP |
| 3,342,614 | 9/1967 | Koons | 106—15 FP |
| 3,403,118 | 9/1968 | Listner | 260—28.5 |
| 3,453,225 | 7/1969 | Pollock | 260—45.7 P |

MORRIS LIEBMAN, Primary Examiner

S. L. FOX, Assistant Examiner

U.S. Cl. X.R.

106—287 R; 252—8.1; 260—33.8 UA

UNITED STATES PATENT OFFICE
CERTIFICATE OF CORRECTION

Patent No. __3,801,526__    Dated __April 2, 1974__

Inventor(s) __Thor J. G. Lonning__

It is certified that error appears in the above-identified patent and that said Letters Patent are hereby corrected as shown below:

Column 4, line 6, "organic" should be corrected to read "organo".

Table I, under the column headed "350°C." the entry of "623.50" should be corrected to read -- 623.60 --.

Footnote 3 of Table I, second line of the footnote, the sentence beginning "The Aroclors are chlorinate" should read --The Aroclors are chlorinated--.

Table II, line 8 under the column headed "350°C." should read "0".

Under Column 6, the paragraph reading "The term "percent weight loss per time unit" as used (first occurence) should read -- The term "halogen or halogenated" as used herein --.

Column 10, line 53, "desirtd" should read -- desired --.

Table III, second section containing Examples 16-27, "Plasticity$^4$" should be corrected to read --Plasticizer$^4$--.

Footnote 5 of Table III, "expoxidized" should be corrected to read "epoxidized".

Footnote 13 of Table III, "Rhom" should be corrected to read -- Rohm --.

Signed and sealed this 30th day of July 1974.

(SEAL)
Attest:

McCOY M. GIBSON, JR.
Attesting Officer

C. MARSHALL DANN
Commissioner of Patents